United States Patent [19]

Darbon et al.

[11] Patent Number: 5,617,210
[45] Date of Patent: Apr. 1, 1997

[54] METHOD OF DETECTING WHETHER AT LEAST ONE DIE IS CENTERED ABOUT A THREAD HELD TAUGHT BETWEEN TWO FIXED POINTS

[75] Inventors: Philippe Darbon, Soisy Sous Montmorency; Bernard Floch, Chaumont En Vexin; Max Matau, Villeneuve La Garenne, all of France

[73] Assignee: Alcatel Fibers Optques, Bezons Cedex, France

[21] Appl. No.: 543,108

[22] Filed: Oct. 13, 1995

[30] Foreign Application Priority Data

Oct. 17, 1994 [FR] France .................................. 94 12352

[51] Int. Cl.$^6$ .................................................. G01B 11/00
[52] U.S. Cl. .......................... 356/399; 356/400; 356/153
[58] Field of Search .................................. 356/399, 400, 356/153

[56] References Cited

FOREIGN PATENT DOCUMENTS 0479120 4/1992 European Pat. Off. .

OTHER PUBLICATIONS

C. G. Askins et al, "Noncontact measurement of optical fiber draw tension", *Journal Of Lightwave Technology*, Aug., 1991, USA, vol. 9, No. 8, ISSN 0733-8724, pp. 945–947.
*Patent Abstracts Of Japan*, vol. 007, No. 077 (C-159), Mar. 30, 1983 corresponding to JP-A-58 009839 (Nippon Denshin Denwa Kosha) Jan. 20, 1983.
*Patent Abstracts Of Japan*, vol. 008, No. 102 (9C-222), May 12 1984 corresponding to JP-A-59 018130 (Nippon Denshin Denwa Kosha) Jan. 30, 1984.

*Primary Examiner*—Frank Gonzalez
*Assistant Examiner*—Robert Kim
*Attorney, Agent, or Firm*—Sughrue, Mion, Zinn, Macpeak & Seas

[57] ABSTRACT

The present invention relates to a method of detecting whether at least one die is centered about a thread held taught between two fixed points separated by a distance L, wherein:

the thread is excited into vibration;

its frequency F of vibration is measured;

the corresponding length $\underline{l}$ of vibrating chord between one of said fixed points referred to as a "reference" fixed point and another point referred to as a "contact" point is deduced therefrom; and length $\underline{l}$ is compared with length L and with the length of the segment of thread between said reference fixed point and said die, so as to deduce therefrom:
either that the thread is touching said die, if length $\underline{l}$ corresponds to the length of the segment, said contact point then being situated at said die;
or else that the thread is not touching said die, if length $\underline{l}$ is equal to the length L between said two fixed points, in which case said die is properly centered, said contact point then coinciding with the other one of said fixed points.

2 Claims, 1 Drawing Sheet

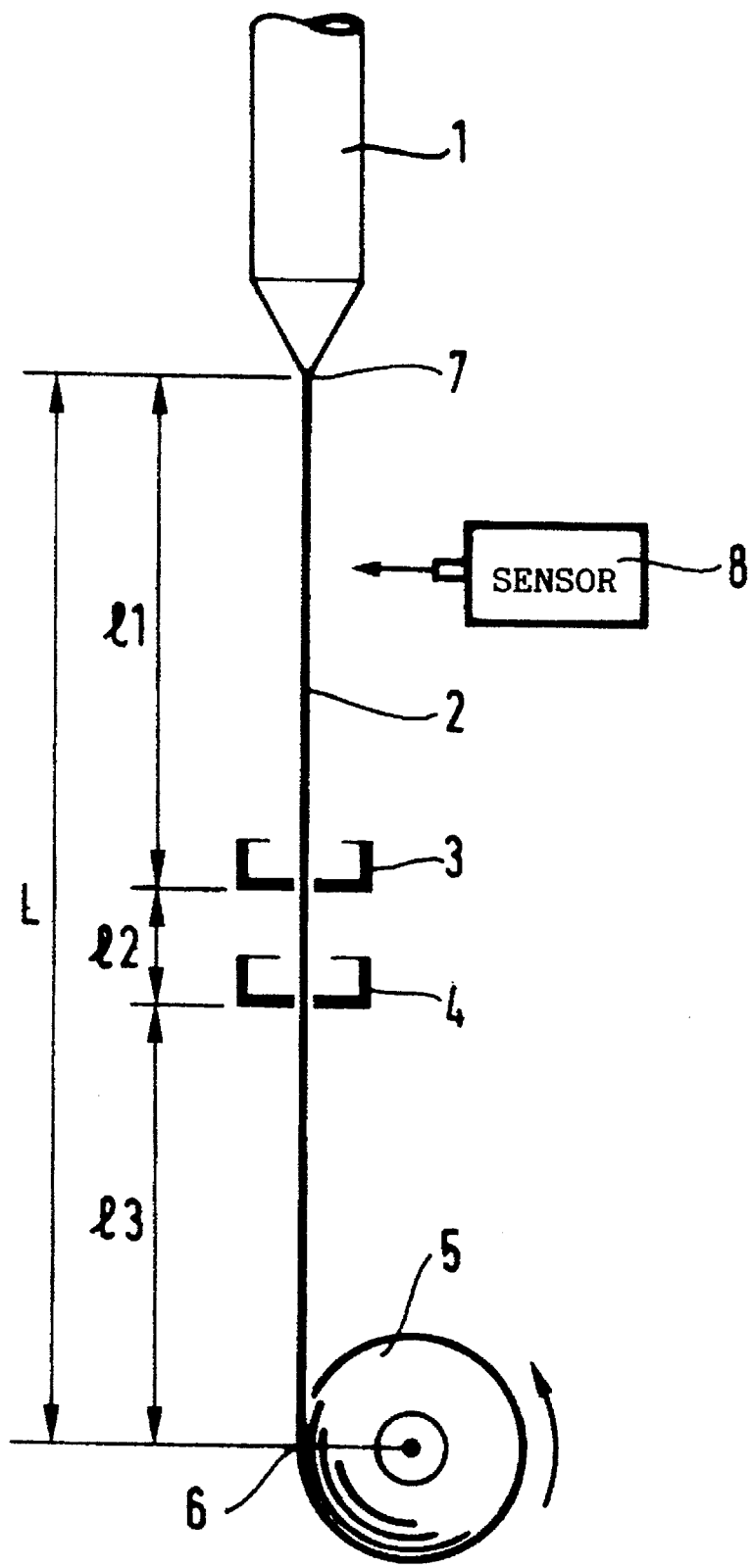

METHOD OF DETECTING WHETHER AT LEAST ONE DIE IS CENTERED ABOUT A THREAD HELD TAUGHT BETWEEN TWO FIXED POINTS

The present invention relates to a method of detecting whether at least one die is centered about a thread held taught between two points.

BACKGROUND OF THE INVENTION

In particular, the invention may be applied to manufacturing an optical fiber on a fiber-drawing lathe. It is known that the fiber is produced from a preform or fiber-drawing cone that is heated. The resulting fiber passes successively through two resin-coating dies so as to provide the fiber with a certain amount of strength. The fiber is then wound onto a capstan applying a certain amount of tension to the fiber. The fiber-manufacturing assembly is disposed vertically.

It is necessary for the two dies to be centered accurately on the fiber so that it is coated properly. If the fiber touches a die, the thickness of the coating is not properly uniform around the entire periphery of the fiber, and the rate of fiber breakage increases.

Currently, a laser is used for centering dies, but given the size of the dies, diffraction occurs and that method is not very satisfactory. The diameter of a helium-neon laser beam is about 0.8 mm, whereas the first die has a diameter of about 0.24 mm, and the second die has a diameter of about 0.32 mm. To avoid diffraction, the diameter of the hole needs to be three or four times the diameter of the light beam.

Another method used relies merely on operator skills, and often means that the alignment achieved is not repeatable.

OBJECTS AND SUMMARY OF THE INVENTION

An object of the present invention is to provide a method that enables good centering to be achieved by very simple means.

To this end, the invention provides a method of detecting whether at least one die is centered about a thread held taught between two fixed points separated by a distance L, wherein:

the thread is excited into vibration;

its frequency F of vibration is measured;

the corresponding length $\underline{l}$ of vibrating chord between one of said fixed points referred to as a "reference" fixed point and another point referred to as a "contact" point is deduced therefrom; and length $\underline{l}$ is compared with length L and with the length of the segment of thread between said reference fixed point and said die, so as to deduce therefrom:
  either that the thread is touching said die, if length $\underline{l}$ corresponds to the length of the segment, said contact point then being situated at said die;
  or else that the thread is not touching said die, if length $\underline{l}$ is equal to the length L between said two fixed points, in which case said die is properly centered, said contact point then coinciding with the other one of said fixed points.

Furthermore, when detecting whether at least two dies are centered, it is possible to determine whether the thread is touching one of said dies, and if so which one, by comparing length $\underline{l}$ with the respective lengths of the segments of thread between the reference fixed point and each of said dies.

BRIEF DESCRIPTION OF THE DRAWING

The invention is described below with reference to the accompanying drawing comprising a sole figure which is a highly simplified diagram showing how an optical fiber is produced and is coated with resin.

MORE DETAILED DESCRIPTION

FIG. 1 shows a preform 1 or fiber-drawing cone from which an optical fiber 2 is produced. The means for heating the preform are not shown since they lie entirely outside the scope of the invention. The fiber 2 passes through two successive coating dies 3 & 4 and on to a winding and traction capstan 5. The dies 3 and 4 are resin-coating dies.

In order to ensure that the thickness of the coating is uniform over the entire periphery of the fiber, it is necessary for the dies 3 and 4 to be centered accurately axially on the fiber 2 which is held taught between the preform 1 and the capstan 5. Furthermore, if the fiber 2 touches one of the dies, the rate of fiber breakage increases.

An object of the invention is therefore to provide a method making it possible to detect whether the dies 3 and 4 are axially centered along and around the fiber 2 which is held taught between the fixed points 6 and 7, so that it is then possible to act on the positioning of the dies in the event that they are not properly centered.

The method of the invention includes exciting the fiber 2 into vibration by suitable known means, e.g. by blowing air onto it.

Then, by means of instrumentation represented in the figure by the reference 8, the frequency of the vibrations produced is measured. This instrumentation is situated between the preform 1 and the first coating die 3. For example, it is constituted by a scanner associated with a spectrum analyzer performing spectrum analysis by Fourier transform, which is a known type of measurement.

Once the frequency F of vibration of the fiber 2 is known, it is easy to apply thereto the formula for determining the frequency of vibration of a vibrating chord held taught between two points so as to deduce the length $\underline{l}$ of vibrating fiber 2 between a reference fixed point which is one of the two fixed points 6 or 7, point 7, and another point, referred to as a "contact" point, which corresponds to said frequency F.

If length $\underline{l}$ corresponds to the length $l_1$ between point 7 and the first die 3, then die 3 is not axially centered and it is touching the fiber. If length $\underline{l}$ is equal to $l_1+l_2$, then the second die 4 is touching the fiber. If length $\underline{l}$ is equal to L, then neither die 3 nor die 4 is touching the fiber, and they are properly axially centered thereon.

The formula giving the frequency of vibration F of a vibrating chord between two points separated by a length $\underline{l}$ is as follows:

$$F = \frac{1}{2l} \sqrt{\frac{s}{\mu}}$$

where $\underline{s}$ is the tension applied to the chord and $\mu$ is the mass per unit length of the chord.

For an optical fiber of relative density 2.20, this gives:

$$F = \frac{1.2 \times 10^{-4}}{ld} \sqrt{s}$$

where d is the diameter of the chord in μm. Hence, $$\text{length } \underline{l} = \frac{1.2 \times 10^{-4}}{Fd} \sqrt{s}$$

Given the voltage s applied to the fiber 1 and the diameter of the fiber, and once the frequency of vibration F has been measured by the instrumentation 8, length $\underline{l}$ is deduced therefrom. By comparing length $\underline{l}$ with the segments of length $l_1$; $l_1+l_2$; and L, it is possible to determine, as described above, whether a die is touching the fiber, and if so which one, or whether, on the contrary, the dies are properly centered.

The method is simple, effective, and cheap, and it can be applied to any material in the form of thread held taught between two points.

We claim:

1. A method of detecting whether at least one die is axially centered about a thread held taut between two fixed points separated by a distance L, said method comprising:

exciting the thread transversely into vibration;

measuring the frequency F of vibration of said thread;

ascertaining the corresponding length $\underline{l}$ of vibrating chord of said thread between one of said two fixed points consisting of a "reference" fixed point and another "contact" point; and comparing said length $\underline{l}$ with length L and with the length of a segment of thread between said reference fixed point and said at least one die, so as to determine:

either that the thread is touching said die, if length $\underline{l}$ corresponds to the length of the segment, and said contact point is then situated at said die;

or else that the thread is not touching said die, if length $\underline{l}$ is equal to the length L between said two fixed points, in which case said die is properly centered, and said contact point coincides with the other one of said two fixed points.

2. A method according to claim 1, wherein said at least one die comprises axially spaced first and second dies centered about said thread, when detecting whether at least two dies are centered, further comprising the step of determining whether the thread is touching one of said two dies, and if so which one, by comparing length $\underline{l}$ with the respective lengths of the segments of the thread between said reference fixed point and each of said first and second dies.

* * * * *